United States Patent
N et al.

(10) Patent No.: US 10,295,010 B2
(45) Date of Patent: May 21, 2019

(54) FLUID-FILLED ENGINE MOUNTING APPARATUS

(71) Applicants: Hyundai Motor Company, Seoul (KR); Kia Motors Corporation, Seoul (KR)

(72) Inventors: Sreenivasan. N, Hyderabad (IN); Man Seok Oh, Yongin-si (KR); Sang Hoon Han, Bucheon-si (KR); P Raghavendar, Hyderabad (IN); B V Krishna Teja, Hyderabad (IN); S Chaitanya Kumar Reddy, Hyderabad (IN)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/832,507

(22) Filed: Dec. 5, 2017

(65) Prior Publication Data
US 2019/0113099 A1 Apr. 18, 2019

(30) Foreign Application Priority Data
Oct. 18, 2017 (IN) .............................. 201711037085

(51) Int. Cl.
*B60K 5/12* (2006.01)
*F16F 13/24* (2006.01)
*F16F 13/22* (2006.01)

(52) U.S. Cl.
CPC ............ *F16F 13/24* (2013.01); *B60K 5/1266* (2013.01); *F16F 13/22* (2013.01)

(58) Field of Classification Search
CPC ............ F16F 13/24; F16F 13/22; F16F 13/28
See application file for complete search history.

(56) References Cited

U.S. PATENT DOCUMENTS

| | | | | |
|---|---|---|---|---|
| 5,261,649 A | * | 11/1993 | Kato | F16F 13/28 267/140.12 |
| 6,234,463 B1 | * | 5/2001 | Akatsu | F16F 13/264 267/140.15 |
| 7,694,945 B2 | * | 4/2010 | Loheide | F16F 13/28 267/140.14 |
| 2009/0026675 A1 | * | 1/2009 | Kanaya | F16F 1/3713 267/141 |

(Continued)

*Primary Examiner* — Hau V Phan
(74) *Attorney, Agent, or Firm* — Morgan, Lewis & Bockius LLP

(57) ABSTRACT

A fluid-filled engine mounting apparatus may include a core provided with a center into which a center bolt is inserted; an insulator with an internal lower portion in which a first fluid chamber is formed and with an upper internal circumferential surface adhered to an external circumferential surface of the core; an upper housing mounted on an upper portion of the insulator; upper and lower orifice plates mounted on an internal circumferential surface of the insulator and are provided with a center hole; a membrane mounted on the center holes between the upper and lower orifice plates; a first case mounted on a lower external circumferential surface of the insulator; a first diaphragm mounted on a lower portion of the insulator that closes the first fluid chamber; and a longitudinal vibration absorbing device provided at an upper portion of the insulator.

17 Claims, 7 Drawing Sheets

(56) References Cited

U.S. PATENT DOCUMENTS

2010/0301530 A1* 12/2010 Koyama ............... F16F 13/268
                                                        267/140.14
2015/0041620 A1*  2/2015 Kim .................... B60K 5/1208
                                                        248/634
2016/0327116 A1* 11/2016 Kim ...................... F16F 13/266
2017/0122399 A1*  5/2017 Kim .................... B60K 5/1208
2017/0152911 A1*  6/2017 Kim .................... B60K 5/1208
2017/0267090 A1*  9/2017 Kim .................... B60K 5/1208

* cited by examiner

FLUID-FILLED ENGINE MOUNTING APPARATUS

CROSS-REFERENCE(S) TO RELATED APPLICATIONS

The present application claims priority to Indian Patent Application No. 201711037085, filed in the Intellectual Property Office on Oct. 18, 2017, the entire contents of which are incorporated herein for all purposes by this reference.

BACKGROUND OF THE INVENTION

Field of the Invention

The present invention relates to a fluid-filled engine mounting apparatus. More particularly, the present invention relates to a fluid-filled engine mounting apparatus that may effectively absorb vibrations generated in a longitudinal direction of a vehicle in addition to the vertical vibrations of an engine.

Description of Related Art

Generally, an engine generates considerable vibrations due to the periodic change of a center position according to the vertical movement of a piston and a connecting rod, inertial force of a reciprocating portion generated in a cylinder axis direction, cyclic change of rotational force applied to a crank shaft by the connecting rod, etc.

The engine is mounted on an engine mounting device with an insulator so that the vibrations are reduced when being transmitted to a chassis frame or a vehicle body.

However, only an insulator is insufficient to adequately and simultaneously absorb various vibrations of the engine that are variously generated in a wide frequency band. To overcome such a drawback, a fluid-filled engine mounting device having a superior damping performance to that of the conventional insulator has been developed and applied.

A conventional fluid-filled engine mounting device is provided with a core into which a center bolt fastened to the engine is inserted, and an insulator having a fluid chamber formed therein is combined to an outer circumferential surface of the core.

In the present case, a plunger device including a steel plate and a rubber member is mounted on a lower end of the center bolt through an assembly bolt.

A housing is combined on an outer circumferential surface of the insulator. Upper and lower orifice plates, with a membrane provided at center holes thereof, are mounted on a lower portion of the fluid chamber of the insulator, and a diaphragm is mounted on the lower orifice plate at a lower portion of the membrane.

In the present case, the membrane is formed in a disk shape, and provided with a plurality of protrusions formed at predetermined intervals along an outer circumferential surface thereof, wherein the membrane is configured to form a gap between the upper and lower orifice plates, and a working fluid flows upward and downward in the fluid chamber through the gap.

However, the conventional fluid-filled engine mounting apparatus has a limitation in reducing the dynamic characteristics in an idle region, and when the dynamic characteristics are reduced by lowering a loss factor, the ride performance may deteriorate during vehicle driving.

In addition, the conventional fluid-filled engine mounting apparatus may efficiently absorb vertical vibrations generated from the engine, but have difficulty absorbing a longitudinal vibration generated when the engine is turned on or off and during rapid acceleration and deceleration.

The information disclosed in this Background of the Invention section is only for enhancement of understanding of the background of the invention and should not be taken as an acknowledgement or any form of suggestion that this information forms the prior art already known to a person skilled in the art.

BRIEF SUMMARY

Various aspects of the present invention are directed to providing a fluid-filled engine mounting apparatus that may improve noise, vibration, and harshness (NVH) performance by effectively absorbing vibrations generated in vertical and longitudinal directions of a vehicle.

Various aspects of the present invention are directed to providing a fluid-filled engine mounting apparatus including: a core provided with a center into which a center bolt is inserted; an insulator provided with an internal lower portion in which a first fluid chamber is formed and with an upper internal circumferential surface adhered to an external circumferential surface of the core; an upper housing mounted on an upper portion of the insulator; upper and lower orifice plates that are respectively mounted on an internal circumferential surface of the insulator at a lower portion of the first fluid chamber and are respectively provided with a center hole at a center thereof; a membrane mounted on the center holes between the upper and lower orifice plates; a first case mounted on a lower external circumferential surface of the insulator; a first diaphragm mounted on a lower portion of the insulator that closes the first fluid chamber; and a longitudinal vibration absorbing device provided at an upper portion of the insulator configured to absorb a longitudinal load and vibration of a vehicle.

The longitudinal vibration absorbing device may include: a protrusion that integrally protrudes with the upper portion of the insulator in which a second fluid chamber is formed that includes an open side; a second case that is inserted into the protrusion and of which internal and external circumferential surfaces are adhered to the insulator; a first nozzle that is mounted on the open side of the protrusion in the second case and provided with a plurality of first through holes; a second nozzle that is combined with the first nozzle and provided with a plurality of second through holes; a decoupler interposed between the first nozzle and the second nozzle; a second diaphragm that is mounted on the second nozzle in a direction opposite to the decoupler and closes the second fluid chamber; and a fixing plate mounted on the second case at the outside of the second diaphragm to fix the second diaphragm to the second nozzle.

The decoupler may partition the second fluid chamber into a front chamber and a rear chamber.

When a load and vibration of a small displacement occurs in a longitudinal direction of the vehicle, the decoupler may form a gap between the first nozzle and the second nozzle wherein a working fluid filled in the second fluid chamber flows into the front or rear chamber through the gap.

A reduction chamber may be formed along circumferences of internal portions of the first nozzle and the second nozzle combined to each other.

The reduction chamber may communicate with the rear chamber through a connection hole formed in the first nozzle.

When a load and vibration of a large displacement occurs in the longitudinal direction of the vehicle, a working fluid of the rear chamber may flow into the reduction chamber through the connection hole.

The decoupler may include a rubber material.

The longitudinal vibration absorbing device may include a protective case that is mounted configured to surround the outside of the second case.

One side of the upper housing corresponding to the longitudinal vibration absorbing device may be formed to have an open cap shape.

A lower housing into which a lower portion of the upper housing is inserted may be mounted on an external circumferential surface of the first case.

One side of the lower housing corresponding to the longitudinal vibration absorbing device may be formed to have an open pipe shape.

At least a mounting bracket may be mounted on the upper housing and an external circumferential surface of the upper housing.

The center bolt may be connected to an engine through a connection bracket.

A ring stopper may be mounted on the upper housing.

The longitudinal vibration absorbing device may be positioned toward a front of the vehicle.

A ring plate may be mounted on the first case so that the first diaphragm is fixed to a lower portion of the lower orifice plate.

According to the fluid-filled engine mounting apparatus according to the exemplary embodiment of the present invention, it is possible to improve NVH performance by effectively absorbing vibrations generated in the vertical and longitudinal directions of a vehicle.

In addition, utilizing the present invention it is possible to efficiently attenuate an amplitude of a nonlinear frequency generated in the vertical and longitudinal directions of the vehicle, to provide a low dynamic spring characteristic in the low and high frequency domains by improving the rigidity of the vehicle, to insulate road surface noises, and to improve ride comfort.

Further, utilizing the fluid-filled engine mounting apparatus according to the exemplary embodiment of the present invention, it is possible to suppress an occurrence of displacement by increasing vertical and longitudinal rigidity of the vehicle with respect to a large displacement occurring during turning, rapid acceleration, and rapid deceleration of the vehicle, and thus, to improve durability of the vehicle and to improve adjustment stability during running of the vehicle.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
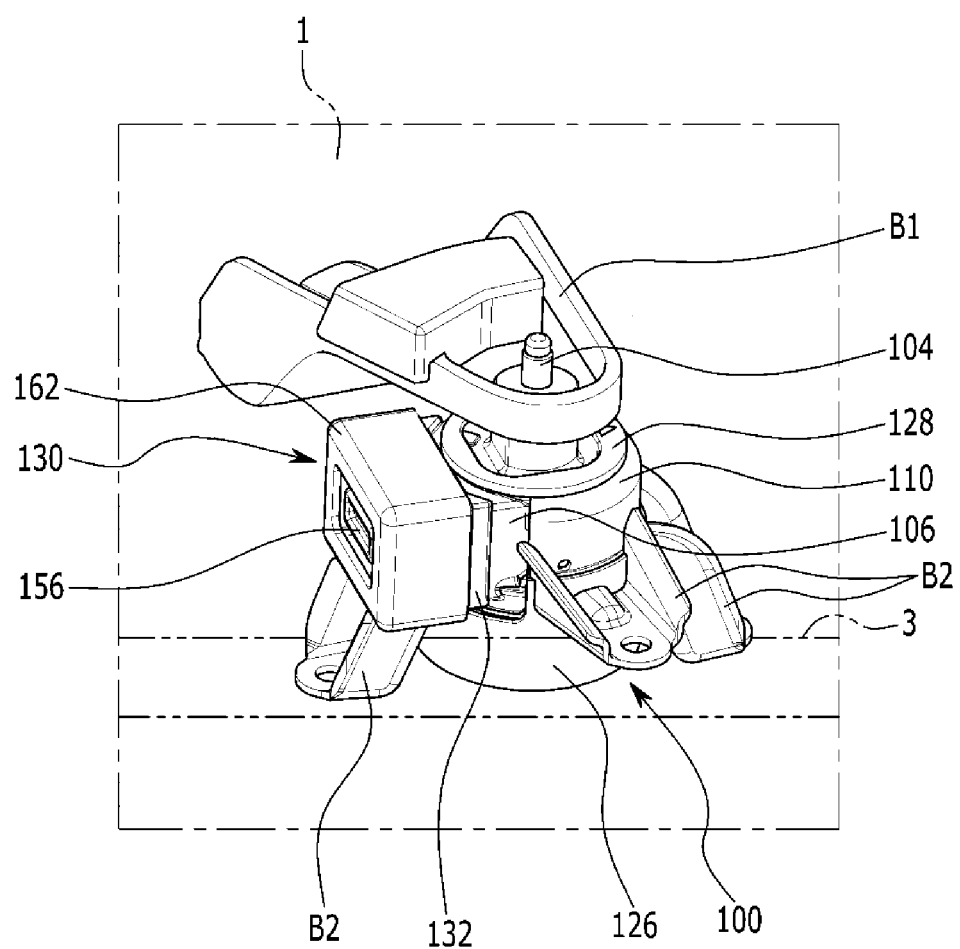
FIG. 1 illustrates a schematic view of a fluid-filled engine mounting apparatus according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the inventions(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended Claims.

To clearly describe the present invention, parts that are irrelevant to the description are omitted, and identical or similar constituent elements throughout the specification are denoted by the same reference numerals.

Moreover, throughout the specification, unless explicitly described to the contrary, the word "comprise" and variations such as "comprises" or "comprising" will be understood to imply the inclusion of stated elements but not the exclusion of any other elements.

Furthermore, terms such as " . . . unit", " . . . means", " . . . part", and " . . . member" described in the specification mean a device of a comprehensive configuration having at least a function or operation.

Figure 2:
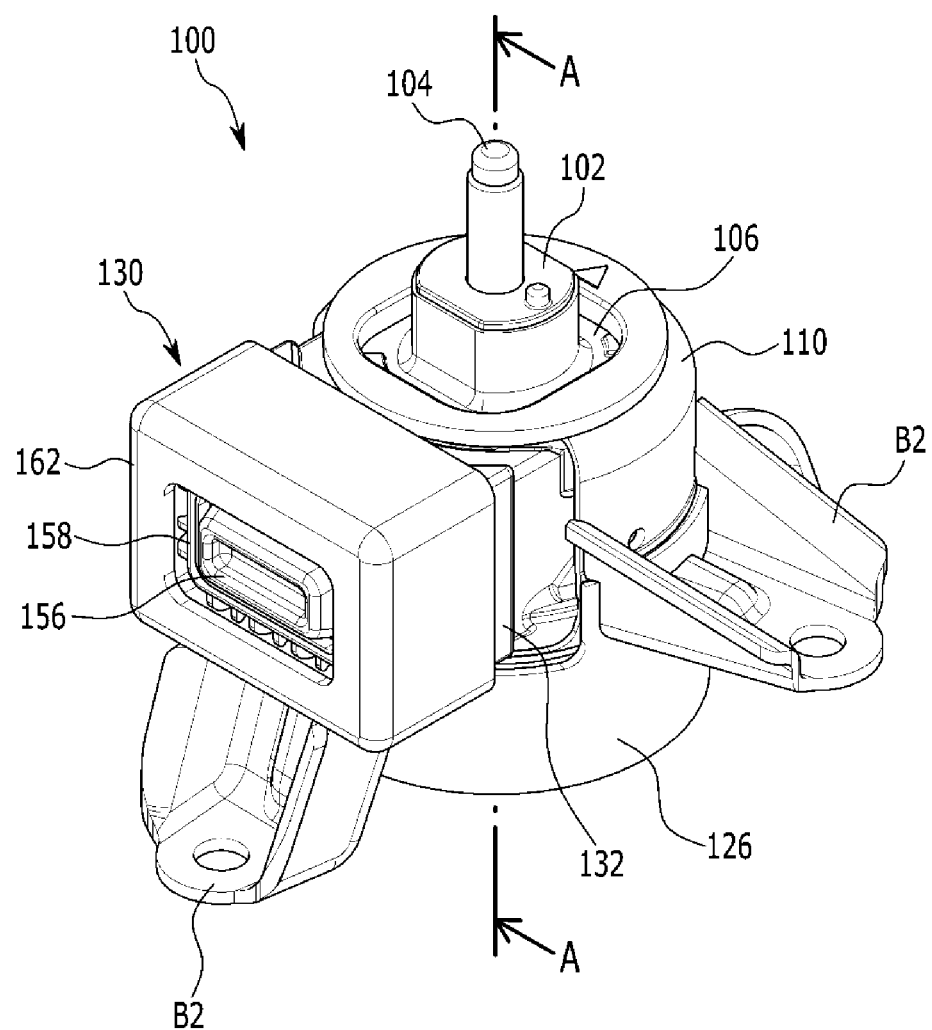
FIG. 2 illustrates a perspective view of a fluid-filled engine mounting apparatus according to an exemplary embodiment of the present invention.
Figure 3:
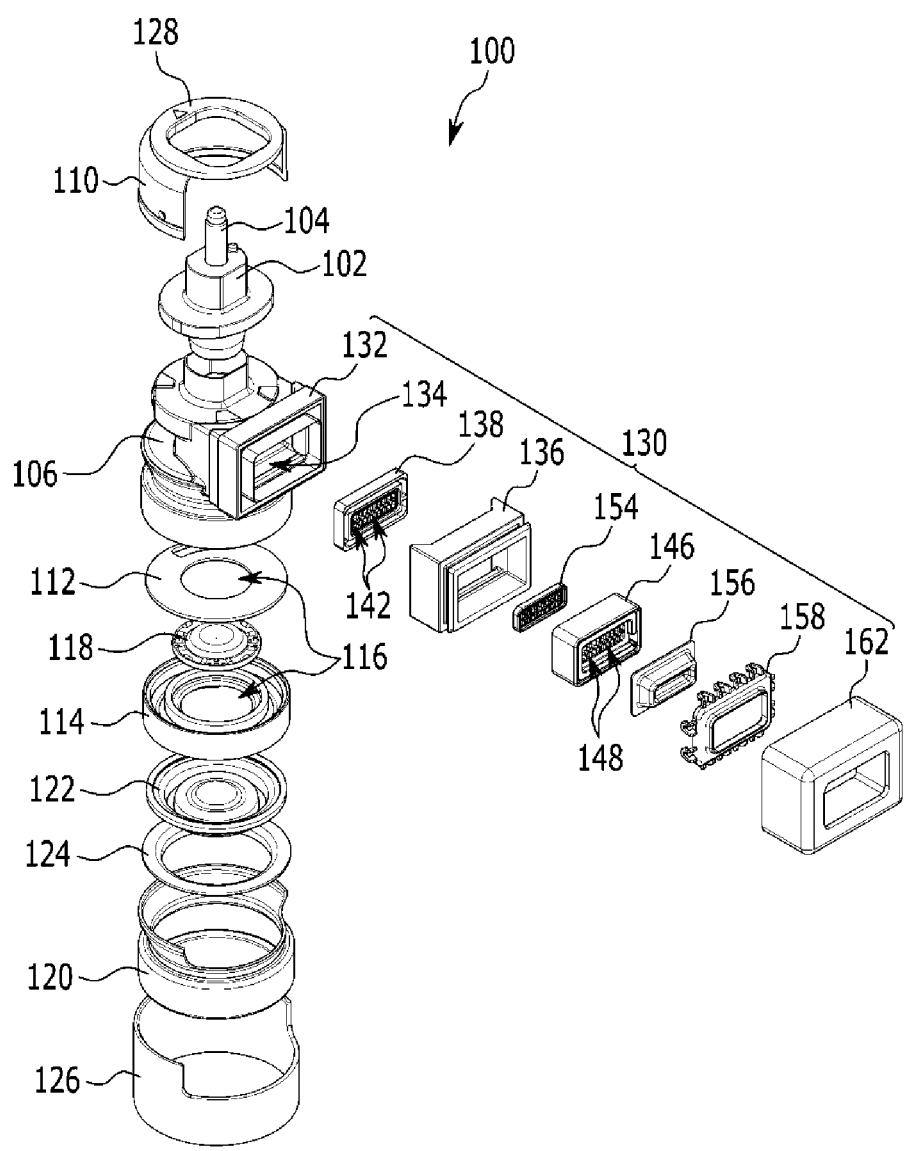
FIG. 3 illustrates an exploded perspective view of a fluid-filled engine mounting apparatus according to an exemplary embodiment of the present invention.
Figure 4:
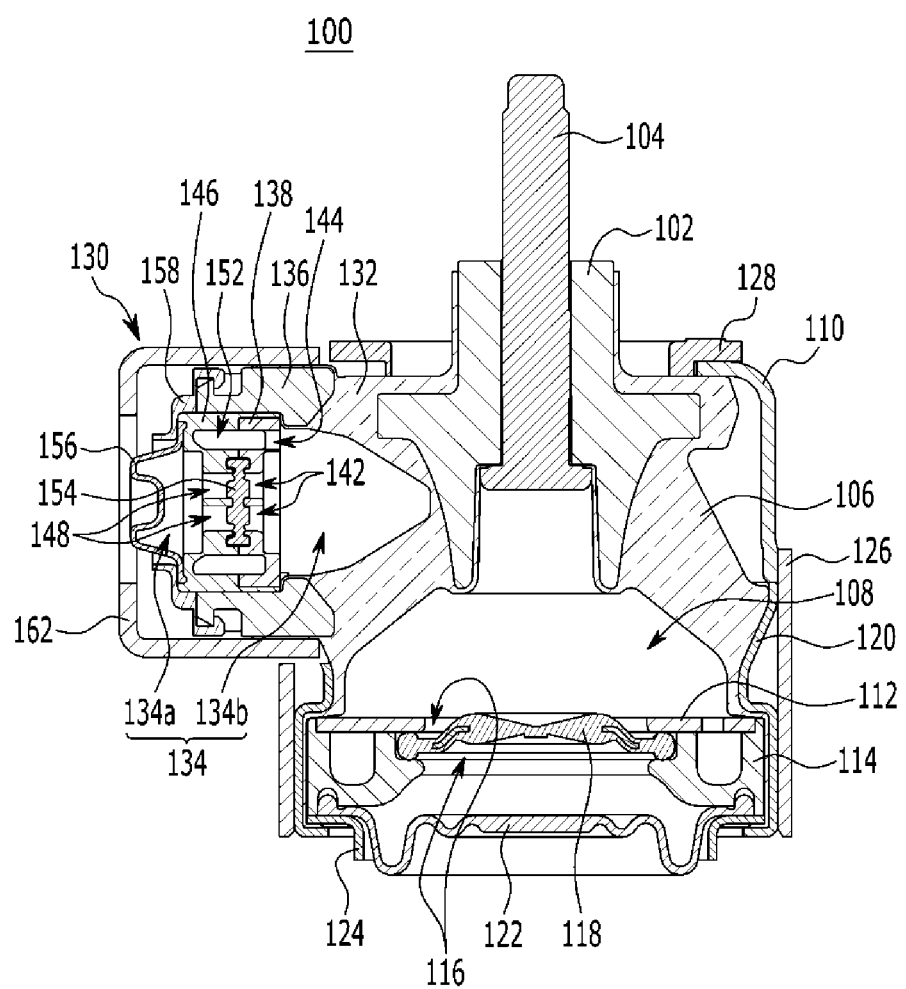
FIG. 4 illustrates a cross-sectional view taken along line A-A of FIG. 2.

FIG. 1 illustrates a schematic view of a fluid-filled engine mounting apparatus according to an exemplary embodiment of the present invention, FIG. 2 illustrates a perspective view of a fluid-filled engine mounting apparatus according to an exemplary embodiment of the present invention, FIG. 3 illustrates an exploded perspective view of a fluid-filled engine mounting apparatus according to an exemplary embodiment of the present invention, and FIG. 4 illustrates a cross-sectional view taken along line A-A of FIG. 2.

Referring to FIG. 1, a fluid-filled engine mounting apparatus 100 according to an exemplary embodiment of the present invention connects an engine 1 to a vehicle body 3, and absorbs vertical, horizontal, and longitudinal loads and vibrations generated from the engine 1 and the vehicle body 3.

The fluid-filled engine mounting apparatus 100, as shown in FIG. 2 and FIG. 3, includes a core 102, an insulator 106, an upper housing 110, upper and lower orifice plates 112 and 114, a membrane 118, a first case 120, and a longitudinal vibration absorbing device 130.

First, a center bolt 104 fastened to the engine 1 through a connection bracket B1 is inserted into the center of the core 102.

A first fluid chamber 108 is provided in an internal lower portion of the insulator 106. An internal circumferential surface of an upper portion of the insulator 106 is adhered to an external circumferential surface of the core 102.

In the exemplary embodiment of the present invention, the upper housing 110 is inserted into the upper portion of the insulator 106. In the present case, a side of the upper housing 110 corresponding to the longitudinal vibration absorbing device 130 may be formed to have an open cap shape.

The upper and lower orifice plates 112 and 114 are mounted on the internal circumferential surface of the insulator 106 at a lower portion of the first fluid chamber 108, and are respectively provided with a center hole 116 at a center thereof.

In the exemplary embodiment of the present invention, the membrane 118 is mounted on the center hole 116 between the upper and lower orifice plates 112 and 114.

The first case 120 is mounted on a lower external circumferential surface of the insulator 106.

The first diaphragm 122 is mounted on the lower orifice plate 114 at a lower portion of the insulator to close the first fluid chamber 108.

In the present case, the membrane 118 is formed to have a disc shape. When a vertical load and vibration is transmitted the membrane 118 from the engine 1 through the center bolt 104, the membrane 118 may form a gap between the upper orifice plate 112 and the lower orifice plate 114.

A working fluid filled in the first fluid chamber 108 flows up and down based on the membrane 118 through the gap to be able to absorb the load and vibration.

A ring plate 124 is mounted on the first case 120 so that the first diaphragm 122 is fixed to a lower portion of the lower orifice plate 114. The ring plate 124 is disposed at a lower portion of the first diaphragm 122.

A lower housing 126 into which a lower portion of the upper housing 110 is inserted may be mounted on an external circumferential surface of the first case 120.

One side of the lower housing 126 corresponding to the longitudinal vibration absorbing device 130 may be formed to have an open pipe shape.

For example, a lower end portion of the upper housing 110 is inserted into the upper portion of the lower housing 126 to be combined to the lower housing 126.

At least a mounting bracket B2 may be mounted on external circumferential surfaces of the upper housing 110 and the lower housing 126 to be connected to the vehicle body 3. In the exemplary embodiment of the present invention, three mounting brackets B2 may be mounted to be distanced from each other by a predetermined angle on circumferences of the upper and lower housings 110 and 126.

A ring stopper 128 is mounted on the upper housing 110.

The ring stopper 128 is configured to prevent the connection bracket B1 from directly contacting the upper housing 110 and the insulator 106.

The longitudinal vibration absorbing device 130 is integrated with the upper portion of the insulator 106 to absorb a longitudinal load and vibration applied to the vehicle. When the fluid-filled engine mounting apparatus 100 is mounted, the longitudinal vibration absorbing device 130 may be positioned toward a front of the vehicle.

As shown in FIG. 3 and FIG. 4, the longitudinal vibration absorbing device 130 includes a protrusion 132, a second case 136, a first nozzle 138, a second nozzle 146, a decoupler 154, a second diaphragm 156, and a fixing plate 158.

The protrusion 132 integrally protrudes with and from the upper portion of the insulator 106 toward the outside. A second fluid chamber 134 is formed inside the protrusion 132. A side of the protrusion 132 may be open to communicate with the second fluid chamber 134.

In the present case, the protrusion 132 may be formed to have a rectangular shape, and a working fluid may be filled in the second fluid chamber 134.

In the exemplary embodiment of the present invention, the second case 136 is inserted into the open one side of the protrusion 132, and internal and external circumferential surfaces of the second case 136 are adhered to the insulator 106.

The first nozzle 138 is mounted on the open one side of the protrusion 132 at the inside of the second case 136. A plurality of first through holes 142 are formed in the first nozzle 138 along a longitudinal direction thereof.

The second nozzle 146 is disposed at a front of the first nozzle 138 and is combined with the first nozzle 138. A plurality of second through holes 148 are formed in the second nozzle 146 along a longitudinal direction thereof.

The decoupler 154 is interposed between the first nozzle 138 and the second nozzle 146. The decoupler 154 may divide the second fluid chamber 134 into a front chamber 134a and a rear chamber 134b.

In the present case, the decoupler 154 may be made of a rubber material.

In the exemplary embodiment of the present invention, the second diaphragm 156 is mounted on the second nozzle 146 in a direction opposite to the decoupler 154 to close the second fluid chamber 134.

The fixing plate 158 is mounted on the second case 136 at the outside of the second diaphragm 156 to fix the second diaphragm 156 to the second nozzle 146.

Accordingly, the decoupler 154 forms a gap between the first nozzle 138 and the second nozzle 146 when a load and vibration of a small displacement are generated in a longitudinal direction of the vehicle, and a working fluid that is filled in the second fluid chamber 134 through the gap may flow into the front and rear chambers 134a and 134b.

For example, when the load and vibration are generated in a longitudinal direction of the vehicle, the working fluid of the second fluid chamber 134 may flow into the front or rear chamber 134a or 134b based on the decoupler 154 in the second fluid chamber 134 to absorb the load and vibration.

In the present case, a reduction chamber 152 may be provided along circumferences of the insides of the first nozzle 138 and the second nozzle 146 that are combined to each other.

The reduction chamber 152 communicates with the rear chamber 134b through a connection hole 144 provided in the first nozzle 138.

Thus, when a load and vibration of a large displacement are applied in the longitudinal direction of the vehicle, the working fluid in the rear chamber 134b flows into the reduction chamber 152 through the connection hole 144. Then, as an entire volume of the second fluid chamber 134 decreases, the load and vibration of the large displacement may be effectively absorbed and reduced.

The longitudinal vibration absorbing device 130 may include a protective case 162 mounted to surround the outside of the second case 136.

The protective case 162 may protect the protrusion 132 together with the second case 136, and may prevent the load and vibration from being directly transmitted to the second diaphragm 156.

Hereinafter, an operation and an application of the fluid-filled engine mounting apparatus 100 according to the exemplary embodiment of the present invention, which is configured as described above, will be described in detail.

Figure 5:
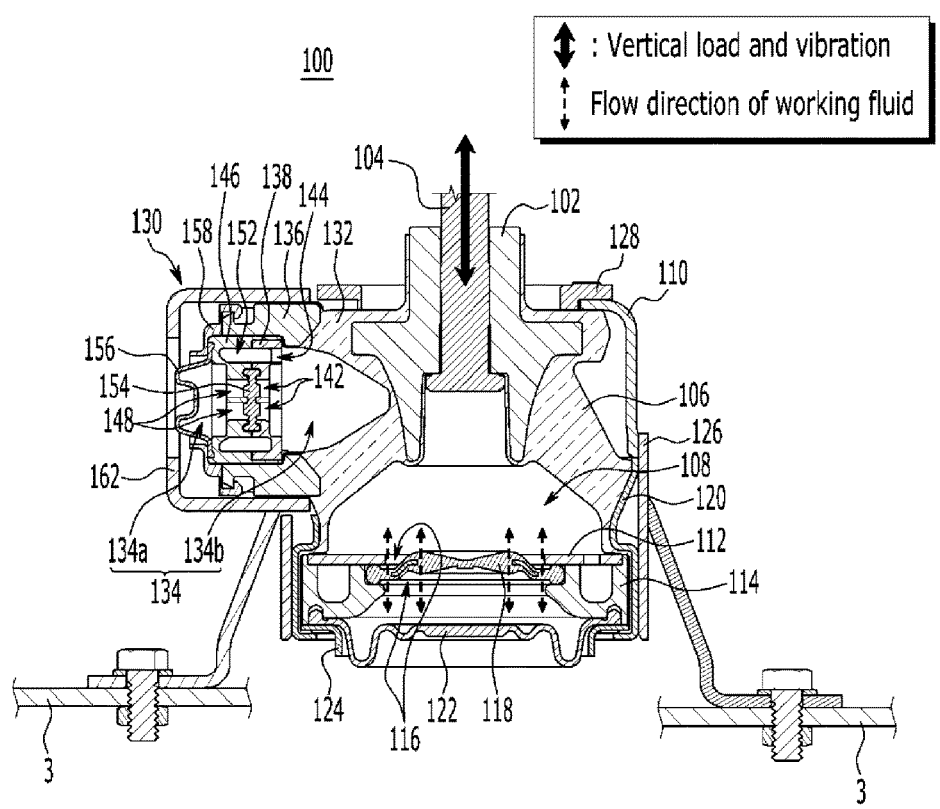
FIG. 5 illustrates an operation state diagram when a vertical load and vibration is applied to a fluid-filled engine mounting apparatus according to an exemplary embodiment of the present invention.
Figure 6:
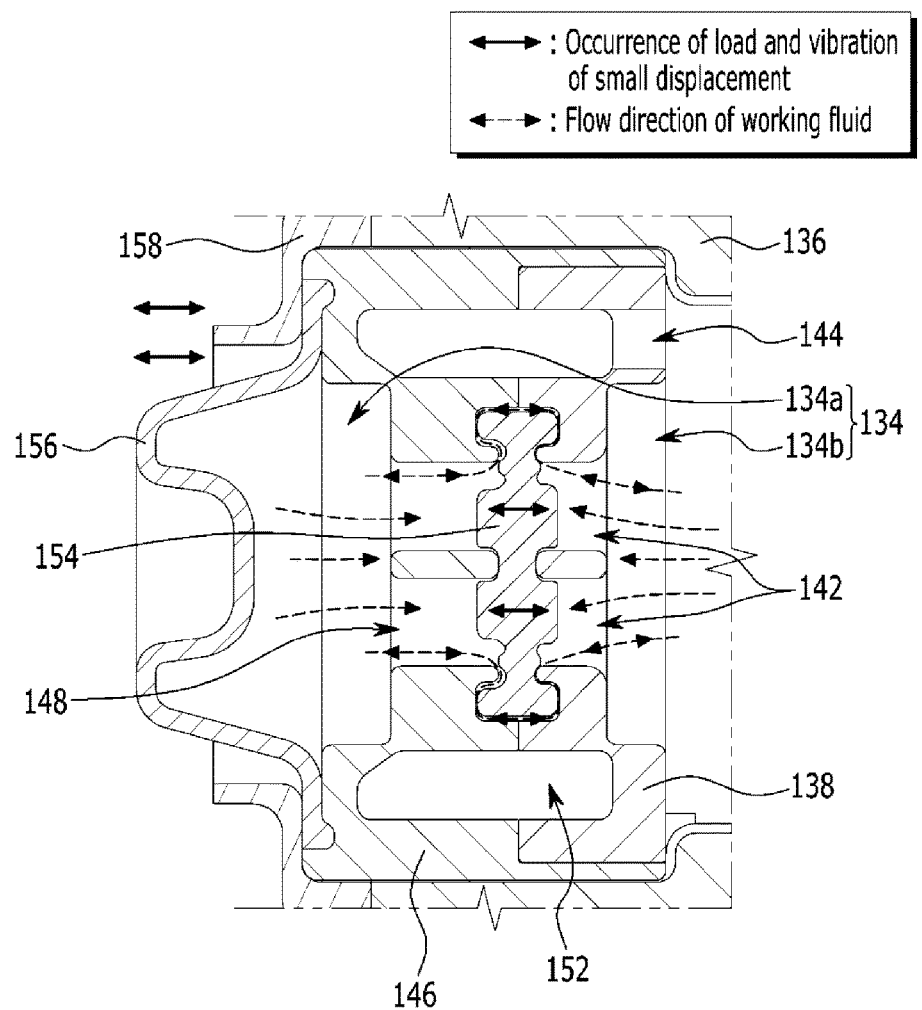
FIG. 6 illustrates an operation state diagram when a longitudinal load and vibration of a small displacement is applied to a fluid-filled engine mounting apparatus according to an exemplary embodiment of the present invention.
Figure 7:
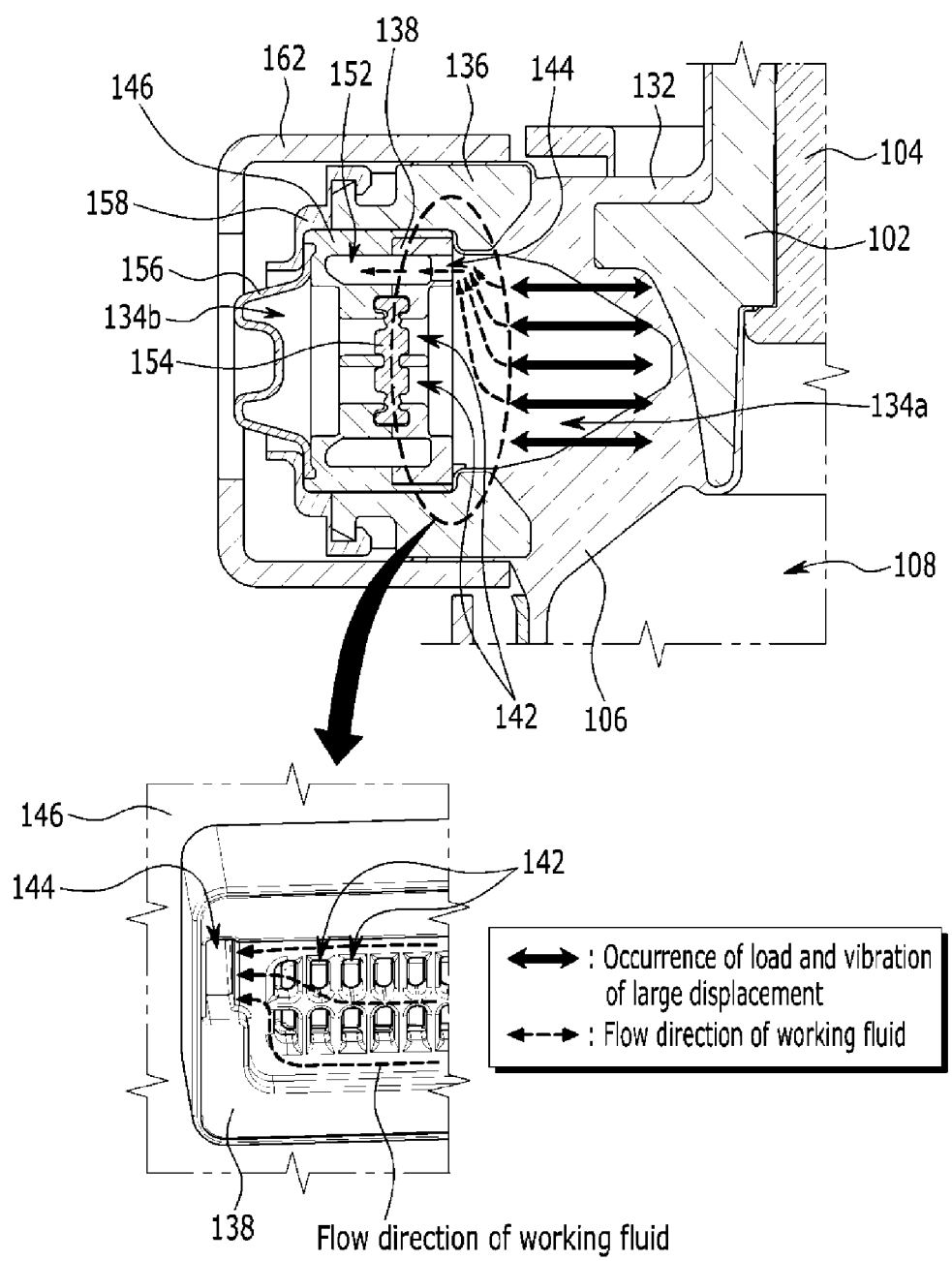
FIG. 7 illustrates an operation state diagram when a longitudinal load and vibration of a large displacement is applied to a fluid-filled engine mounting apparatus according to an exemplary embodiment of the present invention.

FIG. 5 illustrates an operation state diagram when a vertical load and vibration is applied to a fluid-filled engine mounting apparatus according to an exemplary embodiment of the present invention, FIG. 6 illustrates an operation state diagram when a longitudinal load and vibration of a small displacement is applied to a fluid-filled engine mounting apparatus according to an exemplary embodiment of the present invention, and FIG. 7 illustrates an operation state diagram when a longitudinal load and vibration of a large displacement is applied to a fluid-filled engine mounting apparatus according to an exemplary embodiment of the present invention.

First, an operation of the fluid-filled engine mounting apparatus 100 will be described in a case in which a vertical load and vibration occurs while a vehicle is running or stopping.

Referring to FIG. 5, when a vertical load and vibration is transmitted through the center bolt 104, the membrane 118 forms a gap between the upper orifice plate 112 and the lower orifice plate 114.

Thus, the working fluid filled in the first fluid chamber 108 may efficiently absorb the load and vibration while flowing upward and downward based on the membrane 118 through the gap.

An operation of the fluid-filled engine mounting apparatus 100 will now be described in a case in which a load and vibration of a small displacement occurs in the longitudinal direction while the vehicle is running or stopping.

In the present case, the load and vibration of the small displacement may occur while a gear is shifted or while the engine is in an idling state.

Referring to FIG. 6, when the load and vibration of the small displacement occurs in the longitudinal direction of the vehicle, the decoupler 154 of the longitudinal vibration absorbing device 130 forms a gap between the first nozzle 138 and the second nozzle 146, wherein the working fluid filled in the second fluid chamber 134 may flow into the front and rear chambers 134a and 134b through the gap.

Thus, the working fluid of the second fluid chamber 134 flows into the front or rear chambers 134a and 134b based on the decoupler 154 inside the second fluid chamber 134 to be able to absorb the load and vibration.

An operation of the fluid-filled engine mounting apparatus 100 will now be described in a case in which a load and vibration of a large displacement occurs in the longitudinal direction while the vehicle is running.

In the present case, the load and vibration of the large displacement may occur in a state of rapid acceleration or deceleration of the vehicle.

Referring to FIG. 7, when the load and vibration of the large displacement occurs in the longitudinal direction of the vehicle, the working fluid of the rear chamber 134b of the second fluid chamber 134 partitioned by the decoupler 154 flows into the reduction chamber 152 through the connection hole 144.

Then, as the entire volume of the second fluid chamber 134 decreases, the load and vibration of the large displacement may be effectively absorbed. However, when the occurrence of the load and vibration of the large displacement is stopped, the working fluid having flowed into the reduction chamber 152 again flows into the rear chamber 134b through the connection hole 144. Thus, the volume of the second fluid chamber 134 is returned to an initial state.

That is, the longitudinal vibration absorbing device 130 operating as described above may absorb with the amplitude of a high or low frequency domain by controlling the flow of the working fluid irrespective of magnitude of the load and vibration.

Therefore, when the fluid-filled engine mounting apparatus 100 according to the exemplary embodiment of the present invention as described above is applied, the vibration occurring in the vertical direction of the vehicle and the vibration occurring in the longitudinal direction of the vehicle are effectively absorbed, improving overall NVH performance.

In addition, it is possible to efficiently attenuate the vibration regardless of the magnitude of the amplitude of the nonlinear frequency occurring in the vertical and longitudinal directions of the vehicle, to provide the low dynamic spring characteristics in the low and high frequency domains by improving the rigidity of the fluid-filled engine mounting apparatus 100, to insulate the road surface noise, and to improve the ride comfort.

Further, the fluid-filled engine mounting apparatus 100 according to the exemplary embodiment of the present invention may suppress occurrence of displacement by increasing the vertical and longitudinal rigidity of the vehicle with respect to the large displacement occurring during turning, rapid acceleration, and rapid deceleration of the vehicle, improving durability of the vehicle and improving adjustment stability during running of the vehicle.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A fluid-filled engine mounting apparatus comprising:
   a core into which a center bolt is inserted;
   a insulator provided with an upper internal circumferential surface adhered to an external circumferential surface of the core and with an internal lower portion, wherein a first fluid chamber is formed under the internal lower portion of the insulator;
an upper housing mounted on an upper portion of the insulator;
upper and lower orifice plates that are respectively mounted on a lower internal circumferential surface of the insulator at a lower portion of the first fluid chamber and that are respectively provided with a center hole at a center thereof;
a membrane mounted on the center holes of the upper and lower orifice plates between the upper and lower orifice plates;
a first case mounted on a lower external circumferential surface of the insulator;
a first diaphragm mounted on the internal lower portion of the insulator and that closes the first fluid chamber; and
a longitudinal vibration absorbing device provided at the upper portion of the insulator to absorb a longitudinal load and vibration of a vehicle.

2. The fluid-filled engine mounting apparatus of claim 1, wherein
the longitudinal vibration absorbing device includes:
a protrusion that integrally protrudes with the upper portion of the insulator, in which a second fluid chamber is formed, and that includes an open side;
a second case that is inserted into the protrusion and of which internal and external circumferential surfaces are adhered to the insulator;
a first nozzle that is mounted on the open side of the protrusion in the second case and that is provided with a plurality of first through holes;
a second nozzle that is combined with the first nozzle and that is provided with a plurality of second through holes;
a decoupler interposed between the first nozzle and the second nozzle;
a second diaphragm that is mounted on the second nozzle in a direction opposite to the decoupler and that closes the second fluid chamber; and
a fixing plate mounted on the second case at an outside of the second diaphragm configured to fix the second diaphragm to the second nozzle.

3. The fluid-filled engine mounting apparatus of claim 2, wherein
the decoupler partitions the second fluid chamber into a front chamber and a rear chamber.

4. The fluid-filled engine mounting apparatus of claim 3, wherein
when a load and vibration of a predetermined displacement occurs in a longitudinal direction of the vehicle, the decoupler forms a gap between the first nozzle and the second nozzle wherein a working fluid filled in the second fluid chamber flows into the front or rear chamber through the gap.

5. The fluid-filled engine mounting apparatus of claim 3, wherein
a reduction chamber is formed along circumferences of internal portions of the first nozzle and the second nozzle combined to each other.

6. The fluid-filled engine mounting apparatus of claim 5, wherein
the reduction chamber communicates with the rear chamber through a connection hole formed in the first nozzle.

7. The fluid-filled engine mounting apparatus of claim 6, wherein
when a load and vibration of a predetermined displacement occurs in the longitudinal direction of the vehicle, a working fluid of the rear chamber flows into the reduction chamber through the connection hole.

8. The fluid-filled engine mounting apparatus of claim 2, wherein
the decoupler includes a rubber material.

9. The fluid-filled engine mounting apparatus of claim 2, wherein
the longitudinal vibration absorbing device includes a protective case that is mounted to surround an outside of the second case.

10. The fluid-filled engine mounting apparatus of claim 1, wherein
a first side of the upper housing corresponding to the longitudinal vibration absorbing device is formed to have an open cap shape.

11. The fluid-filled engine mounting apparatus of claim 1, wherein
a lower housing into which a lower portion of the upper housing is inserted is mounted on an external circumferential surface of the first case.

12. The fluid-filled engine mounting apparatus of claim 11, wherein
a first side of the lower housing corresponding to the longitudinal vibration absorbing device is formed to have an open pipe shape.

13. The fluid-filled engine mounting apparatus of claim 11, wherein
at least a mounting bracket is mounted on the upper housing and an external circumferential surface of the upper housing.

14. The fluid-filled engine mounting apparatus of claim 1, wherein
the center bolt is connected to an engine through a connection bracket.

15. The fluid-filled engine mounting apparatus of claim 1, wherein
a ring stopper is mounted on the upper housing.

16. The fluid-filled engine mounting apparatus of claim 1, wherein
the longitudinal vibration absorbing device is disposed toward a front of the vehicle.

17. The fluid-filled engine mounting apparatus of claim 1, wherein
a ring plate is mounted on the first case wherein the first diaphragm is fixed to a lower portion of the lower orifice plate.

* * * * *